United States Patent [19]

Lewellyn et al.

[11] Patent Number: 4,902,751

[45] Date of Patent: Feb. 20, 1990

[54] PREPARATION OF MODIFIED ACRYLAMIDE POLYMERS

[75] Inventors: Morris E. Lewellyn; Donald P. Spitzer, both of Fairfield, Conn.

[73] Assignee: American Cyanamid Company, Stamford, Conn.

[21] Appl. No.: 361,089

[22] Filed: Jun. 5, 1989

Related U.S. Application Data

[63] Continuation of Ser. No. 197,884, May 24, 1988, abandoned.

[51] Int. Cl.$^4$ .............................................. C08F 8/32
[52] U.S. Cl. ................................ 525/340; 525/326.4; 525/328.2; 525/328.4; 525/329.2; 525/329.4; 525/344; 525/359.3; 525/380
[58] Field of Search ..................... 525/340, 344, 359.3, 525/380

[56] References Cited

U.S. PATENT DOCUMENTS 2,402,604  6/1946  Coffman ............................... 260/78
4,587,306  5/1986  Vio et al. ............................. 525/380

FOREIGN PATENT DOCUMENTS 88-06602  9/1988  European Pat. Off. .

Primary Examiner—Joseph L. Schofer
Assistant Examiner—Bernard Lipman
Attorney, Agent, or Firm—Frank M. Van Riet

[57] ABSTRACT

A process for the preparation of hydroxamated polymers of acrylamide is disclosed whereby the polymer is reacted with a hydroxylamine salt at pH of at least about 8.0.

3 Claims, No Drawings

PREPARATION OF MODIFIED ACRYLAMIDE POLYMERS

This is a continuation of co-pending application Ser. No. 197,884, filed on May 24, 1988 now abandoned.

BACKGROUND OF THE INVENTION

The preparation of hydroxamated acrylamide polymers is well known in the art. The hydroxamated polymers are disclosed as useful as chelating agents which are useful in the formation of iron complexes and are known to have a favorable effect on drilling muds. The use of these hydroxamated polymers as flocculants is also known.

U.S. Pat. No. 4,587,306 (L. Vio and G. Meunier, assigned to Societe Nationale Elf Aquitaine, 5/6/1986) teaches that hydroxamated polyacrylamides may be produced by the reaction of hydroxylamine with polyacrylamide in an aqueous solution at a temperature of 50° to 85° C. and a pH of about 6.2 to 6.8. The patent indicates that this temperature range is the optimum to minimize the decomposition of hydroxylamine while maintaining a reasonable reaction rate. The pH range disclosed is stated to be that which results in fast kinetics for the reaction. The polymers used were in the molecular weight range of 1000 to 20,000. Other references to making hydroxamated polyacrylamides include U.S. Pat. No. 3,345,344, which describes the reaction of hydroxylamine with a polyacrylonitrile followed by acid hydrolysis. French patent 2,476,113 discusses the reaction of hydroxylamine with polyacrylamide at 90° C. using sodium acetate as a buffer. U.K. Published Patent Application 2171127 and U.S. Pat. Nos. 4,480,067; 4,532,046 and 4,536,296 are also of interest in this regard.

There have been numerous kinetic studies reported in the literature for the reaction of hydroxylamine with monomeric amides such as acetamide, formamide, and acetanilide (W. P. Jencks and Mary Gilchrist, J. Am. Chem. Soc., 86, 5616 (1964); S. O. Eriksson and B. Ariander-ohlson, Acta Chem. Scand., 26, 2759 (1972); and G. B. Sergeev, V. A. Batyuk, and B. M. Sergeev, Kinetika i Kataliz, 15, 236 (1974)). In all cases the optimum pH for this reaction was shown to be between 6 and 7. Jencks and Gilchrist mention a higher rate constant for the reaction above pH 9. These kinetic studies were generally conducted under dilute conditions with a large excess of hydroxylamine to give pseudo-first-order kinetics. Jencks and Gilchrist also state that the reaction is catalyzed by buffers such as imidazole, pyridine, acetate, and carbonate. F. Bergmann (Anal. Chem., 24, 1367 (1952)) has used the high pH reaction of hydroxylamine with amides as an analytical method for the determination of amides.

A. Meister et al (J. Boil. Chem. 215, 441 (1955)) also shows maximum hydroxamic acid formation at pH ~6 for a variety of natural amides.

The above articles, which deal primarily with monomeric species undergoing hydroxamation, refer primarily to pseudo first-order kinetics. When monomeric species are reacted with hydroxylamine salts, the reaction is conducted at a very high hydroxylamine concentration and thus, the kinetics involved are very different and do not readily equate with the kinetics of a polymer system during the hydroxamation of which the hydroxylamine concentration is a minority. At high hydroxylamine concentrations, the rate of reaction will always be very fast. As the concentration of the hydroxylamine decreases, the reaction rate decreases proportionally and the efficiency of conversion of hydroxylamine into hydroxamate group also diminishes. Thus, at low concentrations of hydroxylamine as are experienced in polymer hydroxamation, particularly with high molecular weight polymers, the reaction rate and efficiency of hydroxylamine utilization are critical to the commercial success of the process. If a process could be developed wherein the reaction rate and efficiency of utilization of hydroxylamine was also increased, a long felt need in the art would be satisfied.

SUMMARY OF THE INVENTION

Applicants have now discovered a novel process for the hydroxamation of acrylamide polymers wherein the rate of reaction and the efficiency of hydroxylamine utilization is materially increased over the processes of the prior art, especially U.S. Pat. No. 4,587,306. The prior art teaches one skilled in the art that a pH near the pKa of hydroxylamine is optimum for reaction with acrylamide polymers because at the pH equal to the pKa, there exist equal concentrations of hydroxylamine and the hydroxylamine salt, which salt acts as a catalyst in the reaction.

Applicants have discovered, however, that when polymers are concerned, the rate of reaction unexpectedly increases as the pH is elevated and furthermore, the efficiency of the utilization of the hydroxylamine is optimized. In accordance with Applicants' novel process, therefore, increased hydroxamation is achieved per unit of hydroxylamine used.

DESCRIPTION OF THE INVENTION INCLUDING PREFERRED EMBODIMENTS

The present invention comprises a process for the preparation of an acrylamide polymer containing hydroxamic groups by reacting an aqueous solution of an acrylamide polymer with a hydroxylamine salt at a mole ratio of hydroxylamine to amide groups in the acrylamide polymer of from about 0.1 to about 2.0, a pH of at least about 8.0 and a temperature ranging from about 20°–100° C.

Any water-soluble or water-dispersible acrylamide polymer may be used as a charge material in the instant process. Homopolymers of acrylamide such as polyacrylamide, polymethacrylamide etc, are preferred, but copolymers, terpolymers, etc. of acrylamide, methacrylamide etc, can be used with up to about 90%, preferably up to about 50%, of the copolymer, terpolymer etc. comprising a monoethylenically unsaturated comonomer copolymerizable with said acrylamide. Suitable comonomers include, acrylic acid; methacrylic acid; 2-acrylamido-2-methylpropane sulfonic acid; acrylic and methacrylic acid alkyl esters such as methyl acrylate, ethyl acrylate, butyl acrylate, ethyl methacrylate, methyl methacrylate, etc.; sodium acrylate; vinyl acetate; vinyl pyrrolidone; styrene; acrylonitriles; and the like. The acrylamide polymers can range in molecular weight from about $1 \times 10^4$ to $3 \times 10^7$, preferably $1 \times 10^6$ to $3 \times 10^7$. As these polymers are employed in aqueous solution, the higher the molecular weight polymer used, the more dilute solution thereof is necessary.

The hdroxylamine salts useful herein include the phosphate, perchlorate, sulfate, sulfite, hydrochloride, acetate, propionate, and the like. The sulfate is preferred.

The mole ratio of hydroxylamine to amide groups in the acrylamide polymer should range from about 0.1 to about 2.0, preferably from about 0.5 to about 1.5.

The reaction is conducted for from about 15 minutes to about 30 hours, preferably from about 1 to about 8 hours, the lower times giving relatively lower degrees of hydroxamation in the polymer and higher times resulting in no appreciable increased hydroxamation.

Temperatures ranging from about 20° to about 100° C. may be used, preferably from about 40° C. to about 80° C. The efficiency of the reaction, with respect to degree of hydroxamation, increases at lower temperatures but the rate of reaction decreases. The preferred temperature range thus provides an optimum achievement of hydroxamation and reaction rate.

As mentioned above, the most critical condition under which the instant process is conducted is the pH. By "pH" is meant that pH naturally occurring after substantially complete neutralization of the hydroxylamine salt. The pH must be at least about 8.0, preferably greater than 9.0 and more preferably at least about 11.0, in order to achieve the unexpected results exhibited by the instant invention. At pH's below about 10.0, pH increases during the course of the hydroxamation reaction. Thus, a pH below 8.0 at the start of reaction may increase to well above 8.0 later. For optimum hydroxamation, however, pH must be at least 8.0 throughout the hydroxamation. That is, the initial pH must be at least about 8.0. Because of the buffering action of hydroxylamine, the initial pH of at least 8.0 is achieved by adding sufficient base to substantially completely neutralize the acid salt. Suitable bases include sodium or potassium hydroxide, lime, etc. Weaker bases such as ammonia or sodium acetate can also be used, however, larger quantities thereof are required to obtain the high pH and a stronger base may be required in combination with these weaker bases. Once the acid salt is nuetralized, increased addition of the base results in the initial pH desired.

Any excess ammonia formed during the reaction may be removed such as by heating, applying a vacuum or by evacuation of the system with an inert gas.

The following examples are as set forth for purposes of illustration only and are not to be considered as limitations on the present invention except as set forth in the appended claims. All parts and percentages are by weight unless otherwise specified.

EXAMPLES 1 AND 2

A series of reactions is conducted to examine the effect of pH on the reaction of hydroxylamine with polyacrylamide. The polyacrylamide used is made by the polymerization of acrylamide in aqueous solution using ammonium persulfate and sodium metabisulfite as catalyst, resulting in a molecular weight of about 50,000 to 60,000. The reaction with hydroxylamine is carried out at a concentration of 2.8 moles/l polyacrylamide and 1.27 moles/l hydroxylamine (added as hydroxylamine sulfate) at a temperature of 80° C. The hydroxylamine sulfate is dissolved in water and treated with the appropriate base with cooling and the resulting solution is added to the stirred polyacrylamide solution at the appropriate temperature. Aliquots are taken at regular time intervals and analyzed for unreacted hydroxylamine and for hydroxamate and carboxylate content in the polymer. The hydroxamate content is determined either by precipitating the polymer in methanol and hydrolyzing in concentrated acid followed by ion chromatography analaysis for the liberated hydroxylamine or by $^{13}$CNMR. The carboxylate contents are determined by $^{13}$C NMR. The unreacted hydroxylamine is determined by iodometric titration. Table 1 shows that the fastest kinetics are obtained at a high initial pH (Examples 1 and 2). The amount of hydroxamation obtained is also higher for these runs. Examples C6 and C7 are carried out according to the practice of U.S. Pat. No. 4587396. Note the much slower reaction and lower final hydroxamate levels vs. Examples 1 and 2. The table also lists the rate constants for the hydroxamation reaction at 80° C. Note the rapid increase in rate at pH 8.5 and 10.8.

TABLE I

| Example | % Neut.[1] | Base | pH Initial | pH Final | % Hydroxamate in Polymer 0.5 Hr. | 1 Hr. | 2 Hr. | 3 Hr. | 4 Hr. | 5 Hr. | 6 Hr. | 7 Hr. | K × 10$^{-4}$ |
|---|---|---|---|---|---|---|---|---|---|---|---|---|---|
| C1 | 0 | — | 3.4 | 4.2 | 0.8 | 1.1 | 1.8 | 3.0 | 3.7 | 4.1 | 4.9 | — | 1.17 |
| C2 | 25 | NaOH | 5.0 | 6.0 | 1.2 | 1.3 | 2.8 | 4.1 | 4.4 | 6.4 | 7.8 | 10.6 | 2.18 |
| C3 | 50 | NaOH | 5.8 | 7.2 | 1.3 | 2.5 | 4.1 | 6.7 | 8.5 | 11.9 | 14.1 | — | 3.82 |
| C4 | 75 | NaOH | 6.1 | 9.0 | 1.5 | 1.7 | 3.6 | 7.3 | 8.5 | 10.9 | 12.1 | 12.1 | 3.50 |
| C5 | 90 | NaOH | 6.9 | 10.0 | 1.1 | 1.9 | 3.6 | 6.7 | 11.1 | 14.0 | 12.5 | 14.5 | 3.95 |
| 1 | 100 | NaOH | 8.5 | 10.2 | 4.2 | 8.7 | 17.1 | 20.5 | 21.9 | 21.8 | 21.7 | 21.5 | 11.9 |
| 2 | 108 | NaOH | 10.8 | 10.5 | 16.7 | 23.3 | 27.2 | 26.0 | — | 26.7 | — | 25.2 | 31.1 |
| C6 | 50 | Sodium Acetate | 5.0 | 5.2 | 1.1 | 2.4 | 3.9 | 5.5 | 7.5 | 9.9 | 12.3 | 14.6 | 3.49 |
| C7 | 100 | Sodium Acetate | 5.5 | 5.7 | 2.9 | 3.8 | 6.7 | 9.7 | 14.1 | 15.7 | 18.6 | 19.6 | 5.58 |

[1]Neutralization of hydroxylamine sulfate

EXAMPLES 3-6

The polyacrylamide of Examples 1 and 2 is reacted at a concentration of 1.41M (10 wt%), with 0.63M NH$_2$OH (as hydroxylamine sulfate) at 80° C. Enough NaOH is added to neutralize the H$_2$SO$_4$ in the hydroxylamine sulfate, plus the excess NaOH as indicated in Table 2, below, where the results of the kinetic studies are reported. Even though the lowest pH (or base concentration) is already quite high, there is still a rapid increase in rate with increasing NaOH concentration.

TABLE 2

| Example | Base Concentration[1] Molarity NaOH | pH | Hydroxamate Content (%) 0.5 Hr. | 1 Hr. | 2 Hr. | 3 Hr. | 4 Hr. | 5 Hr. | 6 Hr. | 7 Hr. |
|---|---|---|---|---|---|---|---|---|---|---|
| 3 | 0.07 | 12.8 | 7.1 | 10.4 | 15.1 | 15.8 | 16.5 | 16.9 | 17.0 | 17.2 |

TABLE 2-continued

| Example | Base Concentration[1] Molarity NaOH | pH | Hydroxamate Content (%) | | | | | | | |
|---|---|---|---|---|---|---|---|---|---|---|
| | | | 0.5 Hr. | 1 Hr. | 2 Hr. | 3 Hr. | 4 Hr. | 5 Hr. | 6 Hr. | 7 Hr. |
| 4 | 0.19 | 13.0 | 13.0 | 15.7 | 17.6 | 17.9 | 17.9 | 17.6 | 17.5 | — |
| 5 | 0.38 | 13.6 | 21.0 | 22.1 | 21.9 | 20.8 | 20.4 | 20.0 | 19.4 | 19.2 |
| 6 | 0.63 | 13.8 | 21.3 | 21.7 | 19.7 | 18.7 | 17.7 | 17.2 | 16.7 | — |

[1]Base concentration after neutralization of hydroxylamine sulfate

EXAMPLES 7-11

The polyacrylamide of Examples 1 and 2 is reacted as in Examples 3-6 except that the polymer concentration is 0.70M (5 wt.%) and the NH$_2$OH concentration is 0.32M. The results are set forth in Table 3, below.

In this case, the final hydroxamate level is clearly dependent on the base concentration, increasing with increasing NaOH concentration. Hydroxamate levels are generally lower than in Examples 3-6, where polymer concentration was higher.

TABLE 3

| Example | Base Concentration[1] Molarity NaOH | pH | Hydroxamate Content (%) | | | | | | | |
|---|---|---|---|---|---|---|---|---|---|---|
| | | | 0.5 Hr. | 1 Hr. | 2 Hr. | 3 Hr. | 4 Hr. | 5 Hr. | 6 Hr. | 7 Hr. |
| 7 | 0.02 | 12.3 | 3.0 | 4.7 | 6.6 | 7.3 | 8.0 | 8.5 | 8.9 | 8.9 |
| 8 | 0.1 | 13.0 | 7.5 | 9.5 | 10.7 | 11.2 | 10.8 | 10.9 | 10.9 | |
| 9 | 0.2 | 13.3 | 11.6 | 12.4 | 12.4 | 12.1 | 12.0 | 11.5 | 11.2 | 11.0 |
| 10 | 0.33 | 13.5 | 15.8 | 16.1 | 15.0 | 14.6 | 14.0 | 13.5 | 13.5 | 13.5 |
| 11 | 0.65 | 13.8 | 17.9 | 18.7 | 18.1 | 16.5 | 15.8 | 15.9 | 15.2 | — |

[1]Base concentration after neutralization of hydroxylamine sulfate

EXAMPLES 12-15

For the results in Table 4, the polyacrylamide of Examples 1 and 2 is reacted as in Examples 3-6 except that the polymer concentration is 0.28M (2 wt%) and the NH$_2$OH concentration is 0.13M.

TABLE 4

| Example | Base Concentration[1] Molarity NaOH | pH | Hydroxamate Content (%) | | | | | |
|---|---|---|---|---|---|---|---|---|
| | | | 0.25 Hr. | 0.5 Hr. | 1 Hr. | 2 Hr. | 4 Hr. | 6 Hr. |
| 12 | 0.13 | 13.1 | 3.8 | 4.4 | 4.8 | 4.9 | 4.7 | 4.4 |
| 13 | 0.25 | 13.4 | 6.4 | 6.8 | 7.9 | 7.3 | 7.2 | 7.1 |
| 14 | 0.51 | 13.7 | 8.6 | 8.8 | 9.2 | 9.2 | 8.7 | 8.6 |
| 15 | 1.01 | 14.0 | 9.4 | 9.0 | 8.9 | 8.6 | 8.4 | 8.3 |

[1]Base concentration after neutralization of hydroxylamine sulfate

EXAMPLES 16-19

The procedure of Examples 12-15 is again followed except that the polyacrylamide concentration in solution is 2% and the reaction is conducted at 60° C. The results are set forth in Table 5, below.

TABLE 5

| Example | Base Concentration[1] Molarity NaOH | pH | Hydroxamate Content (%) | | | | | |
|---|---|---|---|---|---|---|---|---|
| | | | 0.25 Hr. | 0.5 Hr. | 1 Hr. | 2 Hr. | 4 Hr. | 6 Hr. |
| 16 | 0.13 | 13.1 | 2.0 | 2.9 | 4.9 | 7.0 | 8.6 | 8.4 |
| 17 | 0.25 | 13.4 | 3.6 | 5.0 | 7.5 | 10.3 | 12.0 | 12.2 |
| 18 | 0.51 | 13.7 | 4.8 | 7.4 | 9.6 | 10.9 | 11.3 | 11.3 |
| 19 | 1.01 | 14.0 | 7.4 | 9.0 | 10.1 | 10.5 | 10.8 | 10.6 |

[1]Base concentration after neutralization of hydroxylamine sulfate

EXAMPLES 20-23

The procedure of Examples 12-15 is again followed except that the reaction is conducted at 40° C. The results are set forth in Table 6, below. Note the large increase in both rate and final hydroxamation level when advancing from 2.0M NaOH to 4.0M NaOH. Thus, at a temperature as low as 40° C., the rate of hydroxamation is rapid at sufficiently high pH.

TABLE 6

| Example | Base Concentration[1] Molarity NaOH | pH | Hydroxamate Content (%) | | | | | |
|---|---|---|---|---|---|---|---|---|
| | | | 0.25 Hr. | 0.5 Hr. | 1 Hr. | 2 Hr. | 4 Hr. | 6 Hr. |
| 20 | 0.5 | 13.7 | 3.1 | 4.0 | 5.4 | 8.3 | 11.6 | 13.1 |
| 21 | 1.0 | 14.0 | 4.3 | 5.1 | 7.6 | 11.0 | 13.2 | 14.3 |
| 22 | 2.0 | 14.3 | 8.0 | 8.9 | 11.0 | 12.9 | 14.1 | 14.4 |
| 23 | 4.0 | 14.6 | 14.7 | 16.1 | 17.6 | 19.2 | 20.6 | 20.5 |

[1]Base concentration after neutralization of hydroxylamine sulfate

EXAMPLES 24–30

Following the procedure of Examples 1 and 2 except that the polyacrylamide has a molecular weight of about 15 million, various polymer/hydroxylamine concentrations are charged and reacted at varying pHs, temperatures and times in accordance therewith. The results are set forth in Table 7, below. Notice that in Examples 24–26 an increasing incorporation of hydroxamate with increasing pH is shown at the same ratio of polymer to hydroxyamine. Comparison of the data of Examples 27–30 with that shown in Table 5 for polymer of much lower molecular weight under nearly identical conditions shows virtually the same hydroxmamation response.

TABLE 7

| Ex. | Concentration Pam | $NH_2OH$ | °C. | Hrs. | pH | % Hydroxamate in Polymer |
|---|---|---|---|---|---|---|
| 24C | 0.38 M | 0.38 M | 75 | 18 | 6.2 | 7 |
| 25 | 0.28 M | 0.28 M | 80 | 3 | 9.5 | 16 |
| 26 | 0.28 M | 0.28 M | 80 | 4 | 11.0 | 23 |
| 27 | 0.28 | 0.14 | 60 | 0.5 | 12.0 | 7 |
| 28 | 0.28 | 0.14 | 60 | 1 | 12.0 | 10 |
| 29 | 0.28 | 0.14 | 60 | 2 | 12.0 | 13 |
| 30 | 0.28 | 0.14 | 60 | 4 | 12.0 | 13 |

C = Comparative

EXAMPLE 31

The procedure of Examples 1 and 2 is again followed except that hydroxylamine hydrochloride salt is employed. Similar results are achieved.

EXAMPLE 32

Again following the procedure of Examples 1 and 2, except that the polymer is a copolymer (M.W. 72,000) of acrylamide and acrylic acid (90:10), similar results are recorded.

EXAMPLES 33

The procedure of Example 32 was followed except that the copolymer is replaced by the following polymers:

Example 33—Acrylamide/sodium acrylate (60:40) M.W. 120,000.
Example 34—Polymethacrylamide; M.W. 2 million.
Example 35—Acrylmaide/acrylonitrile (70:30) M.W. 8000.
Example 36—Acrylamide/ethyl acrylate (80:20) M.W. 8 million.
Example 37—Acrylamide/acrylic acid/styrene 80:10:10) M.W. 800,000.

In each instance, substantially equivalent results are achieved.

EXAMPLES 38–40

Replacement of the hydroxylamine of Example 31 with 38) 0-methylhydroxylamine, 39) N-ethylhydroxylamine and 40) O-phenyl hydroxylamine results in analogous hydroxamation of the polymer in each instance.

We claim:

1. In a process for the preparation of an acrylamide polymer containing hydroxamic groups by reacting an aqueous solution of an acrylamide polymer with a hydroxylamine salt at a mole ratio of hydroxylamine to amide groups in the acrylamide polymer of from about 0.1 to about 2.0, the improvement which comprises conducting the reaction at a pH of at least about 11.0, a temperature ranging from about 40°–80° C., for from about 1–4 hours and at a polymer solution concentration of at least 2%, by weight, the polymer having a molecular weight of from about $10^6$ to about $3 \times 10^7$, said pH being that naturally occurring after substantially complete neutralization of said hydroxylamine salt.

2. A process according to claim 1 wherein the acrylamide is acrylamide.

3. A process according to claim 1 wherein the polymer is polyacrylamide.

* * * * *